United States Patent [19]
Schirm et al.

[11] 3,912,342
[45] Oct. 14, 1975

[54] TURBO-MACHINES

[75] Inventors: Albert C. Schirm, Cheektowaga; Fred K. Kunderman, Olean, both of N.Y.

[73] Assignee: Dresser Industries, Inc., Dallas, Tex.

[22] Filed: Jan. 9, 1974

[21] Appl. No.: 431,823

[52] U.S. Cl. .................................. 308/36.3; 277/75
[51] Int. Cl.² ......................................... F16J 15/28
[58] Field of Search .................... 308/36.1, 36.3, 73; 277/75, 74

[56] References Cited
UNITED STATES PATENTS

| | | | |
|---|---|---|---|
| 2,527,941 | 10/1950 | Lauck et al. | 308/36.3 X |
| 3,172,709 | 3/1965 | Baudry | 308/73 X |
| 3,339,990 | 9/1967 | Wendt | 308/73 |
| 3,421,412 | 1/1969 | Ackley | 308/36.1 X |

Primary Examiner—M. Henson Wood, Jr.
Assistant Examiner—Michael Mar
Attorney, Agent, or Firm—Roy L. Van Winkle; John N. Hazelwood

[57] ABSTRACT

An improved seal is disclosed herein for use in turbo-machines. The seal includes an annular seal body encircling the shaft and having a surface portion thereon arranged to frictionally engage the turbo-machine housing. A counterbore is formed in one end of the seal body and a plurality of bearing shoes are movably attached to the body and located in the counterbore. The seal body includes a sealing surface adjacent the shaft which is held in concentricity with the shaft by the bearing shoes. The seal is located in a cavity in the housing. The cavity receives pressurized fluid that exerts a biasing force on the seal to force the seal into frictional and sealing engagement with the housing thereby providing additional stiffness to the shaft.

4 Claims, 4 Drawing Figures

TURBO-MACHINES

BACKGROUND OF THE INVENTION

This invention relates generally to improvements in turbo-machinery. More particularly, but not by way of limitation, this invention relates to an improved seal for use in turbo-machines.

The desirability for providing a plurality of stages in turbo-machinery has led to the use of relatively long shafts. Considerable difficulty due to vibrations that are induced into the relatively flexible shafts have been encountered. The shaft design problems are further complicated by the fact that it is desirable to maintain the shaft diameter as small as possible to reduce the inertia of the rotating parts of the machine. At the same time, it is necessary to maintain shaft stiffness to reduce vibration of the shaft as the rotative speed passes through the various critical speeds of the shaft. It is also desirable to increase the critical speeds as much as possible in view of present day high shaft speeds. The vibrational problems are amplified due to the necessity in some machines of utilizing oil film seals and also due to the presence of the oil film located in the shaft bearings.

It has been shown in the past that the so-called sleeve-type bearings and seals are most effective but that they also introduce a phenomenon known as "oil whirl" or "oil whip" which usually occurs at about one-half of the first critical speed. The oil whirl tends to induce additional vibrational forces into the shaft.

The oil whirl problem has been alleviated to some extent by the formation of grooves in the seals and bearings and by the reduction in the length of the bearings or seals. Perhaps the most effective bearing, from the standpoint of reduction of the oil whirl problem, is the pad-type bearing.

It has also been found that the shaft can be stiffened to some extent by the use of seals that are biased by fluid under pressure against the housing so that frictional engagement between the seal and housing occurs. Such force resists lateral motion of the shaft as it is rotated until the frictional force is exceeded.

This invention provides an improved seal that functions effectively as a seal, provides the minimum of oil whirl and also serves to stiffen the shaft.

SUMMARY OF THE INVENTION

The foregoing objects and advantages of the invention are accomplished by the improved seal of this invention. The seal is useful in turbo-machinery that includes a housing, a shaft journaled in a housing, a cavity in the housing encircling the shaft and means for applying fluid pressure in the cavity. The seal is adapted for location in the cavity and comprises: an annular seal body having first and second ends, a surface portion on the first end arranged to frictionally and sealingly engage the housing, a bore extending therethrough intersecting the ends and sized to receive the shaft. The seal body also includes a sealing surface in the bore adjacent the shaft that is cooperable with the shaft to prevent fluid flow between the sealing surface and the shaft and has a counterbore in the second end of the body. A plurality of bearing shoes are movably attached to the body and located in the counterbore. The shoes have a generally arcuate inner surface arranged to slidingly mate with the shaft to maintain the sealing surface concentric with the shaft, whereby fluid pressure applied in the cavity biases the surface portion against the housing to aid in stiffening the shaft.

DESCRIPTION OF THE PREFERRED EMBODIMENT

Figure 1:
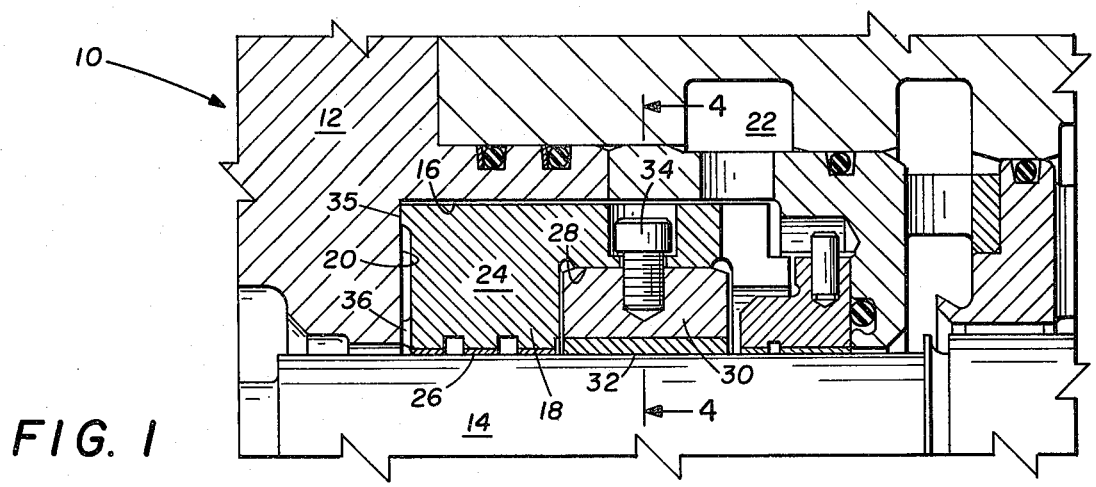
FIG. 1 is a partial cross-sectional view of a turbo-machine including the improved seal constructed in accordance with the invention.

Referring to the drawing and FIG. 1 in particular, shown therein and generally designated by the reference character 10 is a turbo-machine constructed in accordance with the invention. As will be appreciated, FIG. 1 is a fragmentary view primarily showing portions of the turbo-machine 10 that are related to the invention.

The turbo-machine 10 includes a housing 12, a shaft 14 that extends therethrough and is journaled therein. The shaft 14 may include one or more impellers (not shown).

The housing 12 includes a cavity 16 sized to receive a seal assembly 18. The cavity 16 forms a radially oriented annular surface 20 for purposes that will become more apparent hereinafter. Also, the housing 12 is provided with an annular passageway 22 constructed and arranged to receive a fluid under pressure that serves to lubricate the seal 18, to provide sealing fluid to the seal, and to provide a biasing force on the seal 18 as will be described more fully hereinafter.

The seal assembly 18 includes a seal body 24 having a bore 26 extending therethrough. A counterbore 28 extends into the seal body 24 from one end of the bore 26. Mounted in the counterbore 28 are a plurality of bearing shoes 30.

Each of the bearing shoes 30 has an inner surface 32 that is sized and arranged to slidingly mate with the shaft 14. The bearing shoes 30 are each supported by a threaded fastener 34 that extends loosely through the seal body 24 permitting the shoes 30 to move relative to the seal body 24.

Figure 4:
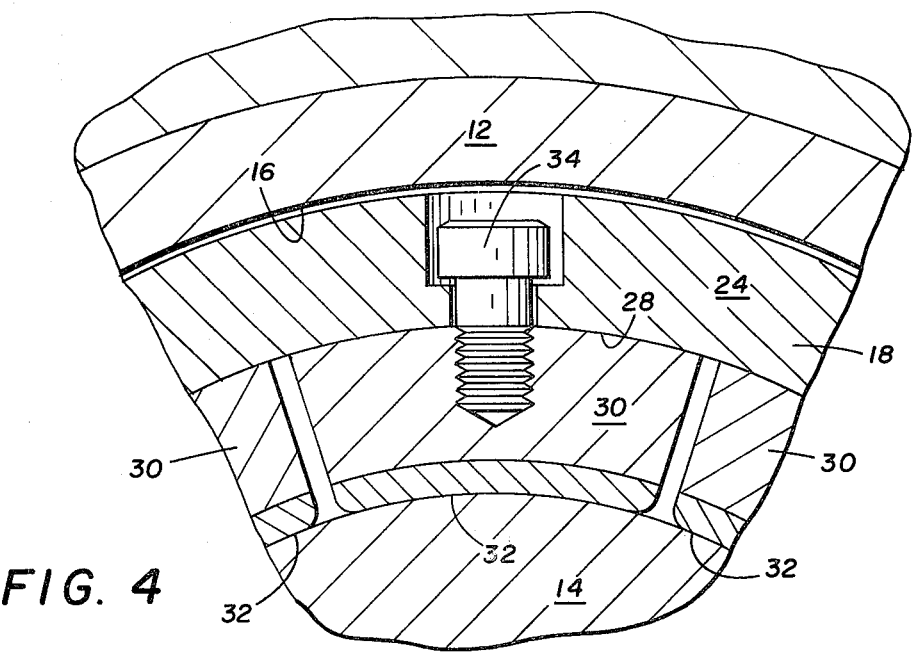
FIG. 4 is a cross-sectional view taken generally along the line 4—4 of FIG. 1.

The cross section of FIG. 4, which is taken along the line 4—4 of FIG. 1, illustrates the structure of the bearing shoes 30 and the relation of the surfaces 32 thereon to the shaft 14. It should be pointed out that it is the interrupted structure of the bearing shoes 30 that are believed to eliminate, or at least alleviate, the oil whirl which is frequently associated with vibration problems in high speed rotating shafts moving in sleeve-type bearings. The shoes 30 have a centering effect on the seal body 24 retaining the bore 26 substantially concentric with the shaft 14. The concentricity provided permits the bore 26, which is also a seal with respect to the shaft 14, to be sized much closer to the outside diameter of the shaft 14 without danger of damage to the seal if shaft vibration occurs.

The seal body 24, on the left end as shown in FIG. 1, is provided with an annular seal portion 35 that is located adjacent the outer periphery of the seal body 24.

Near the inner periphery of the seal body 24, there are provided a plurality of lugs 36 (only one is shown in FIG. 1). The lugs 36 are spaced radially about the seal body 24 in spaced relation to the seal portion 35 as illustrated in FIG. 1.

The seal portion 35 engages the annular surface 20 and is held thereagainst by the pressure of fluid in the passageway 22 which acts on the seal body 24 in a direction to force the seal body 24 relatively to the left as illustrated in FIG. 1. Due to the seal between the outer periphery of the shaft 14 and the surface 26 in the bore of the seal body 24, the fluid pressure acts essentially across the entire annular cross-sectional area of the seal body 24 exerting the maximum biasing force on the seal body 24. Accordingly, the annular seal portion 35 and the lugs 36 frictionally engage the radial surface 20 of the housing 12 and provide the maximum support against lateral movement of the shaft 14 as the shaft attempts to vibrate. In fact the seal assembly 18, due to such frictional force and the arrangement of the bearing shoes 30, will act as a bearing adding stiffness to the shaft 14 until the lateral force exerted by vibration of the shaft 14 produces forces of sufficient magnitude to overcome the frictional engagement.

Operation of the Preferred Embodiment

With the seal 18 installed as illustrated in FIG. 1, fluid pressure exerted in the annular passageway 22 and in the cavity 16 acts across the seal assembly 18 biasing the seal body 24 into frictional engagement with the radial surface 20 in the housing 12. The frictional force restrains the bearing 18 against lateral movement adding stability to the shaft 14 to resist vibration until such vibrational forces generate a lateral force sufficient to overcome the frictional engagement as previously mentioned. The amount of frictional force generated will be dependent upon the fluid pressure in the passageway 22.

In the usual arrangement of turbo-machinery, the seal assemblies 18 will be located inboard of the end bearings supporting the shaft 14 in the housing 12. Since the seals 18 have the ability to function as bearings, and since such seals are located inboard of the end bearings, it follows that the lateral stability added to the shaft 14 will make it possible to operate the turbo-machine 10 at higher critical speeds since the shaft 14 will be stiffer.

Also, it should be pointed out that the seal between the seal body 24 and the shaft 14 will maintain its effectiveness since the shoes 30 retain the seal body 24 in concentricity with the shaft 14, thus avoiding damage to the seal body 24 even though shaft vibration occurs. Damage is avoided because the seal body 24 moves with the shaft 14 if the frictional force is overcome.

Figure 2:
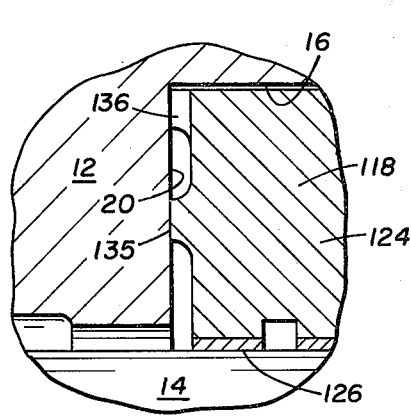
FIG. 2 is an enlarged partial view of another embodiment of a seal also constructed in accordance with the invention.

Description of the Modification of FIG. 2

The enlarged fragmentary view of FIG. 2 illustrates a variation or modification of the seal assembly 18. In this view, the same reference characters as previously used in connection with the description of FIG. 1 will be utilized on all parts that are unchanged.

As shown in FIG. 2, the modified seal assembly 118 includes a bore 126 providing a sealing surface adjacent the shaft 14. The end of the seal in engagement with the radial surface 20 of the shaft 12 has been altered. An annular sealing surface 135 on the end of the seal body 124 is located approximately midway of the inner and outer peripheries of the seal body 124. Lugs 136 are positioned in radial spaced relationship adjacent the outer periphery of the seal body 124.

With the annular seal portion 135 located as shown in FIG. 2, it will be appreciated that pressure fluid in the cavity 16 will pass the lugs 136 on the left end of the body 124. The net biasing force will be the difference in the cross-sectional annular area of the seal body 124 between the annular seal portion 135 and the bore 126 rather than being across the entire cross-sectional annular area of the body 24 as shown in FIG. 1. Thus, the biasing force generated by such fluid will be diminished as compared to the arrangement shown in FIG. 1.

As was previously mentioned in connection with FIG. 1, the biasing force can be varied by changing the fluid pressure in the passageway 22 and the cavity 16. However, the pressure is usually predetermined by the primary sealing requirements. It will be apparent in the embodiment shown in FIG. 2 that the biasing force may also be varied by changing the position of the annular seal portion 135 on the left end of the seal body 124.

Figure 3:
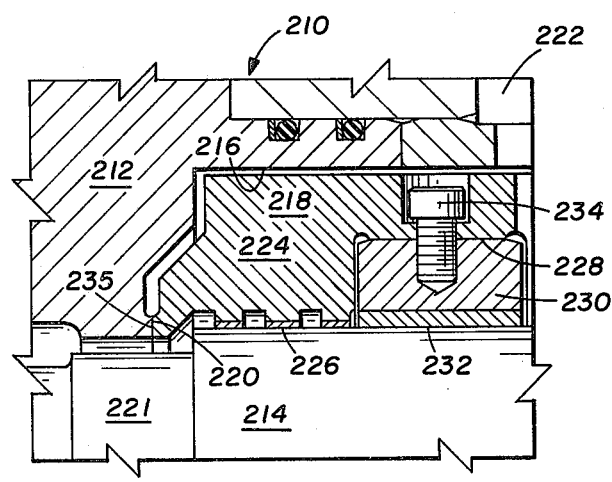
FIG. 3 is a view similar to FIG. 1 but illustrating still another embodiment of a seal constructed in accordance with the invention.

Description of the Embodiment of FIG. 3

The fragmentary cross-sectional view of FIG. 3 illustrates another modification of the seal illustrated in FIG. 1. Referring to FIG. 3, there is shown a turbo-machine generally designated by the reference character 210. The turbo-machine 210 includes a housing 212 that journals a shaft 214 which may carry one or more impellers (not shown) as desired.

The housing 212 includes a cavity 216 that is sized to receive a seal assembly 218. The cavity 216 forms a radially oriented surface 220 for purposes that will be described more fully hereinafter. It will be noted that the shaft 214 includes a portion 221 of reduced diameter to accommodate the radial surface portion 220 of the housing 212 which has a mean diameter that is substantially equal to the larger portion of the shaft 214 shown.

The seal assembly 218 includes a seal body 224 having a bore 226 that extends substantially therethrough. The bore 226 is interrupted by an inwardly projecting portion providing an annular seal portion 235 that is arranged to sealingly and frictionally engage the surface 220 on the housing 212. A counterbore 228 extends into the seal body 224 from the end thereof opposite the seal portion 235. The counterbore 228 is sized and arranged to receive a plurality of segmented bearing shoes 230.

Each of the bearing shoes 230 has a generally arcuate inner surface 232 that is arranged to slidingly mate with the exterior of the shaft 214. Each of the bearing shoes 230 is loosely retained in the counterbore 228 by a threaded fastener 234 as previously described in connection with the threaded fasteners 34 of FIG. 1.

The operation of the seal assembly 218 in the turbo-machine 210 is precisely as described in connection with the seal assembly 18 of the turbo-machine 10 described in connection with FIG. 1. However, it will be noted that the modification to the seal 224 has the annular seal portion 235 thereon located near the shaft 214. In fact, the diameter of the contact line between the seal portion 235 and the surface 220 of the housing 212 is only slightly larger than the diameter of the bore 226. With this arrangement, it can be seen that fluid pressure in the passageway 222 and in the cavity 216 will act on both ends of the seal body 224. The slight differential area subject to fluid pressure is a result of the sealing engagement between the seal portion 235 and the surface 220 as compared to the full area of the other end exposed to the fluid pressure. Thus, the force biasing the seal assembly 218 into frictional engagement with the housing 212 is reduced to a minimum positive value. That is, with this arrangement, the least amount of frictional force can be generated by the seal assembly 218 on the housing 212.

Such an arrangement may be desirable if the fluids in the turbo-machine 210 are of such high pressure that the sealing fluid pressure in the cavity 216 will exert an undue biasing force on the seal assembly 218. It can be seen that the arrangement of the seal body 224 provides means for limiting the biasing force even though the fluid pressure may be extremely high. Thus, the seal assembly 218 remains effective to prevent the loss of fluid from the interior of the turbo-machine 210 and yet still retain the ability to aid in stiffening the shaft 214 due to frictional engagement between the seal surface 234 and the housing 212 at the radial surface 220.

It will be understood that the foregoing detailed description has been presented by way of example only and that many modifications and changes can be made thereto without departing from the spirit and scope of the invention.

The embodiments of an invention in which an exclusive property or privilege is claimed are defined as follows:

1. An improved seal for turbo-machines including a housing, a shaft journaled in the housing, a cavity in the housing encircling the shaft and means for applying fluid pressure in the cavity, said seal being adapted for location in the cavity and comprising:

an annular seal body having first and second ends, an annular, axially projecting, seal portion on said first end arranged to frictionally and sealingly engage the housing, a plurality of radially spaced, axially projecting lugs on said first end spaced from said seal portion and engageable with the housing, a bore extending therethrough intersecting said ends and sized to receive the shaft, a sealing surface in said bore adjacent the shaft and cooperable with the shaft to prevent fluid flow between said sealing surface and the shaft, and a counterbore in said second end; and, a plurality of bearing shoes movably attached to said body and located in said counterbore, said shoes having a generally arcuate inner surface arranged to slidingly mate with the shaft to maintain said sealing surface concentric with the shaft, whereby fluid pressure applied in the cavity biases said surface portion against the housing to aid in stiffening the shaft.

2. The improved seal of claim 1 wherein said seal portion is located adjacent the outer periphery of said seal body.

3. The improved seal of claim 1 wherein said seal portion is located adjacent the inner periphery of said seal body.

4. The improved seal of claim 3 wherein the shaft is reduced in diameter adjacent the first end of said seal body and said seal portion has a diameter approximately equal to the diameter of said sealing surface to reduce the force biasing said seal against the housing to a minimum positive value.

* * * * *